United States Patent [19]
Krishnamurthy et al.

[11] Patent Number: 5,761,720
[45] Date of Patent: Jun. 2, 1998

[54] PIXEL ENGINE PIPELINE PROCESSOR DATA CACHING MECHANISM

[75] Inventors: Subramanian Krishnamurthy, Mountain View, Calif.; James Peterson, Portland, Oreg.; Glenn Poole, Fremont; Walt Donovan, Milpitas, both of Calif.

[73] Assignee: Rendition, Inc., Mountain View, Calif.

[21] Appl. No.: 616,540

[22] Filed: Mar. 15, 1996

[51] Int. Cl.$^6$ ................................................ G06F 12/08
[52] U.S. Cl. ................... 711/140; 711/137; 711/213; 711/170
[58] Field of Search ................... 395/467, 460, 395/463, 497.01, 497.04, 115, 116, 565, 523; 711/137, 213, 140, 169, 170-173, 3, 219, 109, 136

[56] References Cited

U.S. PATENT DOCUMENTS

| | | | |
|---|---|---|---|
| 4,794,524 | 12/1988 | Banning et al. | 395/800.32 |
| 5,136,696 | 8/1992 | Beckwith et al. | 395/597 |
| 5,148,536 | 9/1992 | Witek et al. | 395/467 |
| 5,185,856 | 2/1993 | Alcorn et al. | 395/130 |
| 5,297,251 | 3/1994 | Alcorn et al. | 395/343 |
| 5,421,028 | 5/1995 | Swanson | 395/800.42 |
| 5,454,076 | 9/1995 | Cain et al. | 395/507 |
| 5,579,473 | 11/1996 | Schlapp et al. | 395/501 |
| 5,602,984 | 2/1997 | Mieras | 395/501 |

FOREIGN PATENT DOCUMENTS 465847 1/1992 European Pat. Off.

OTHER PUBLICATIONS

Cragon, Memory Systems and Pipelined Processors, pp. 408–412, 1996.

Mano, Computer System Architecture, 2nd Ed., pp. 501 and 508, 1982.

*Primary Examiner*—Matthew M. Kim
*Attorney, Agent, or Firm*—Blakely, Sokoloff, Taylor & Zafman LLP

[57] ABSTRACT

A method and an apparatus for providing requested data to a pipeline processor. A pipeline processor in a graphics computer system is provided with a data caching mechanism which supplies requested data to one of the stages in the pipeline processor after a request from a prior stage in the pipeline processor. With the sequential nature of the pipeline processor, a prior stage which knows in advance the data which will be requested by a subsequent stage can make a memory request to the data caching mechanism. When processing reaches the subsequent stage in the pipeline processor, the displayed data caching mechanism provides the requested data to the subsequent processing stage with minimal or no lag time from memory access. In addition, the data caching mechanism includes an adaptive cache memory which is optimized to provide maximum performance based on the particular mode in which the associated pipeline processor is operating. Furthermore, the adaptive cache includes an intelligent replacement policy based on a direction in which data is being read from memory as well as the particular mode in which the associated pipeline processor is operating.

45 Claims, 10 Drawing Sheets

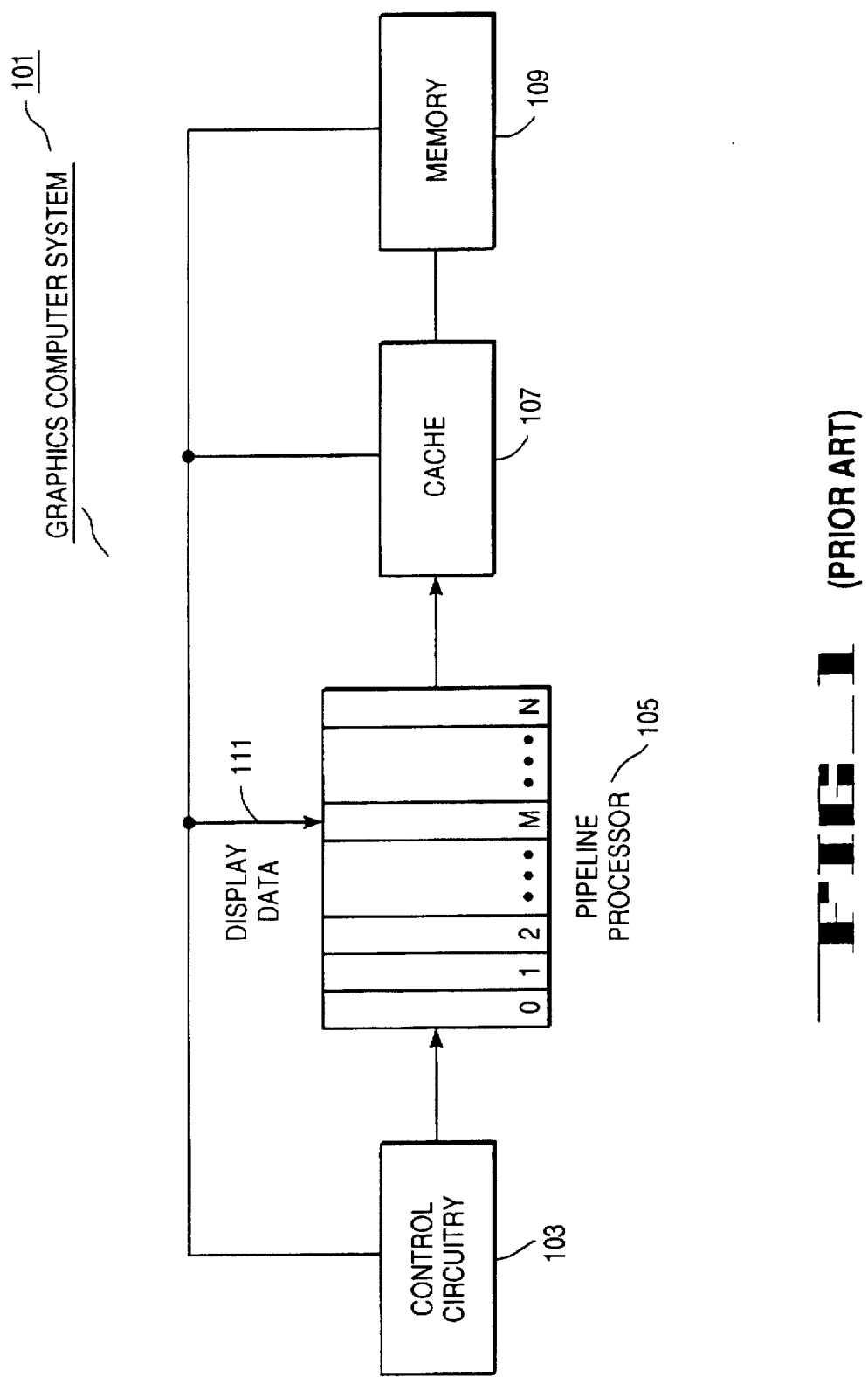
FIG_1 (PRIOR ART)

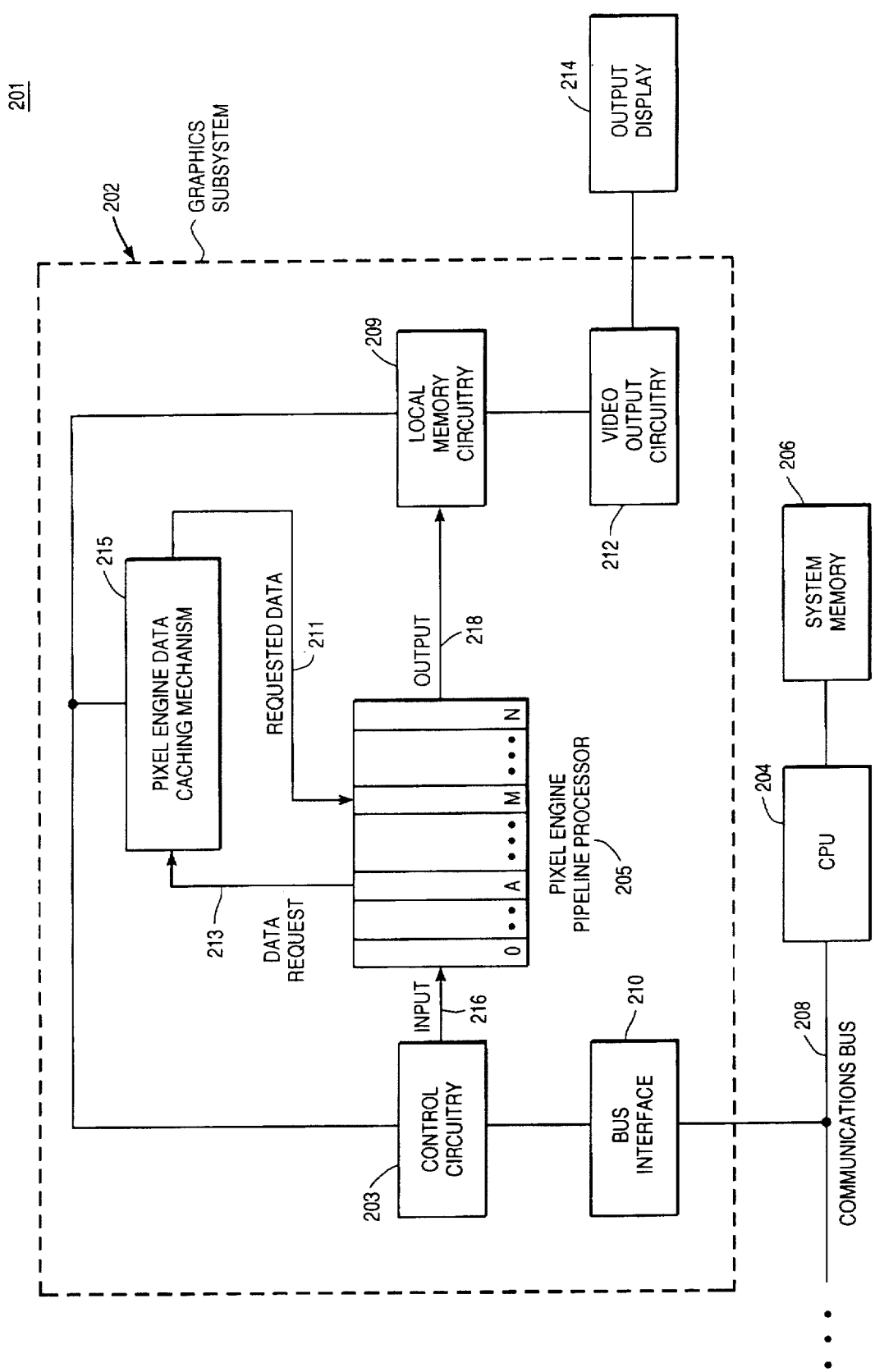

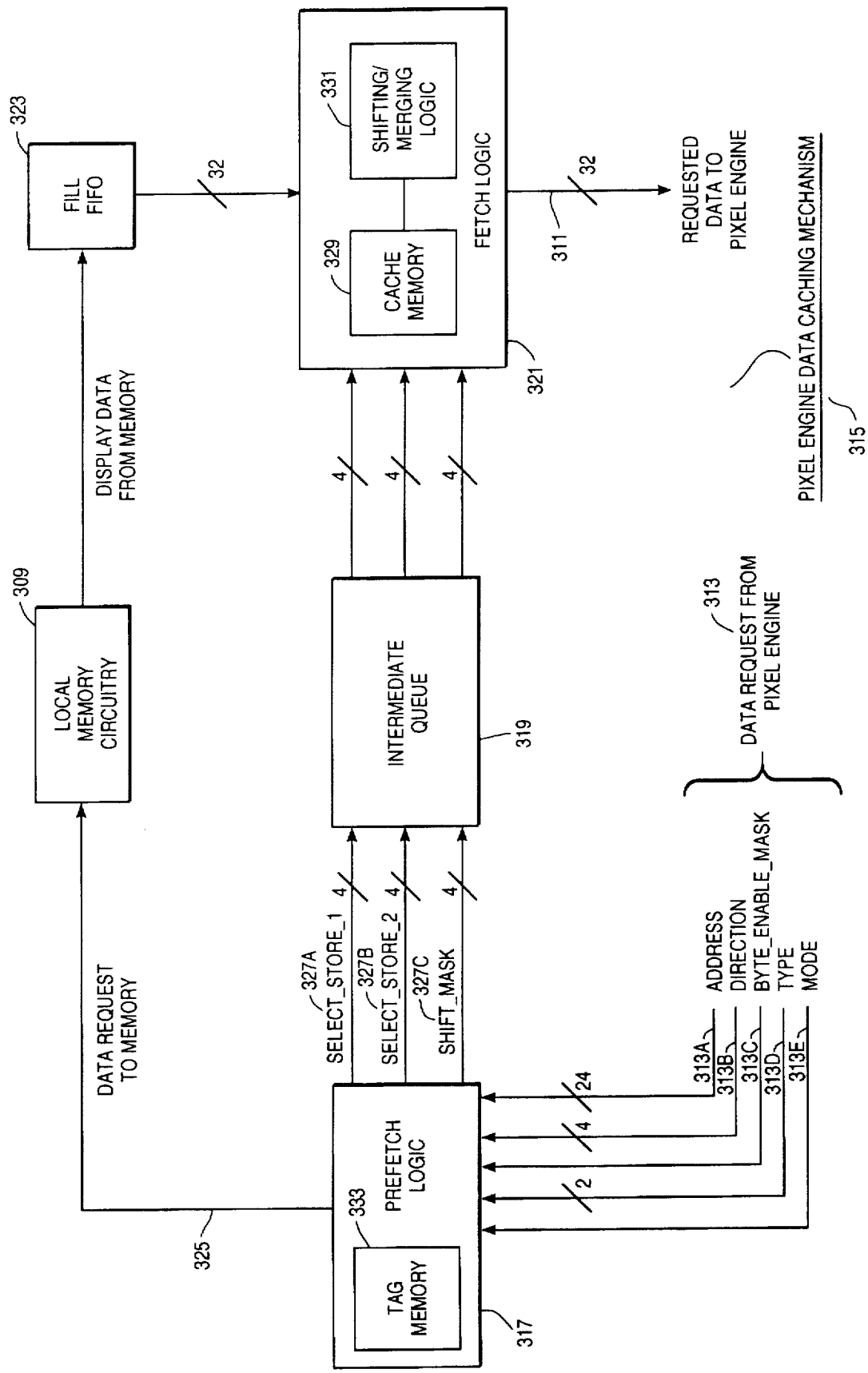

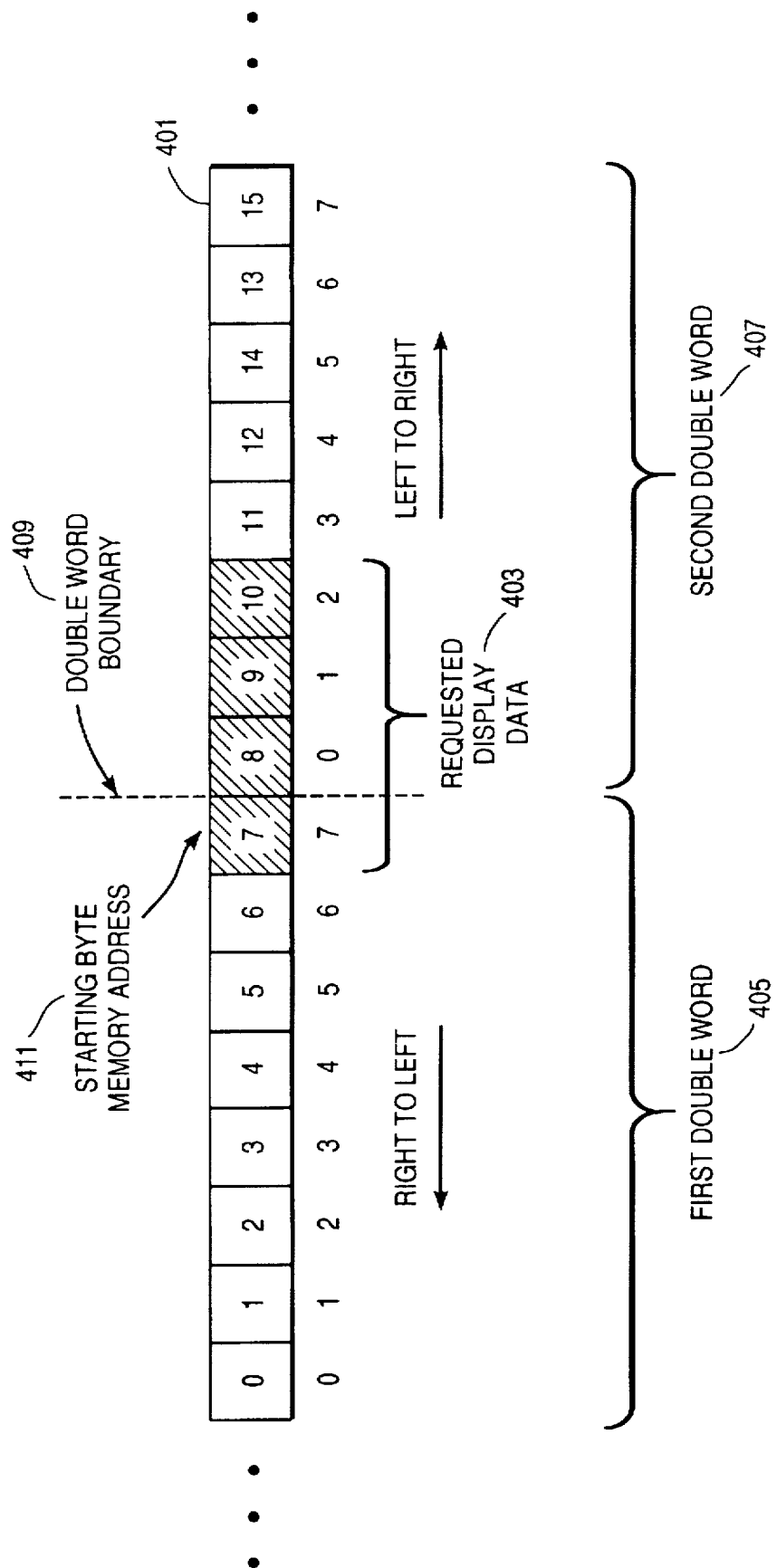

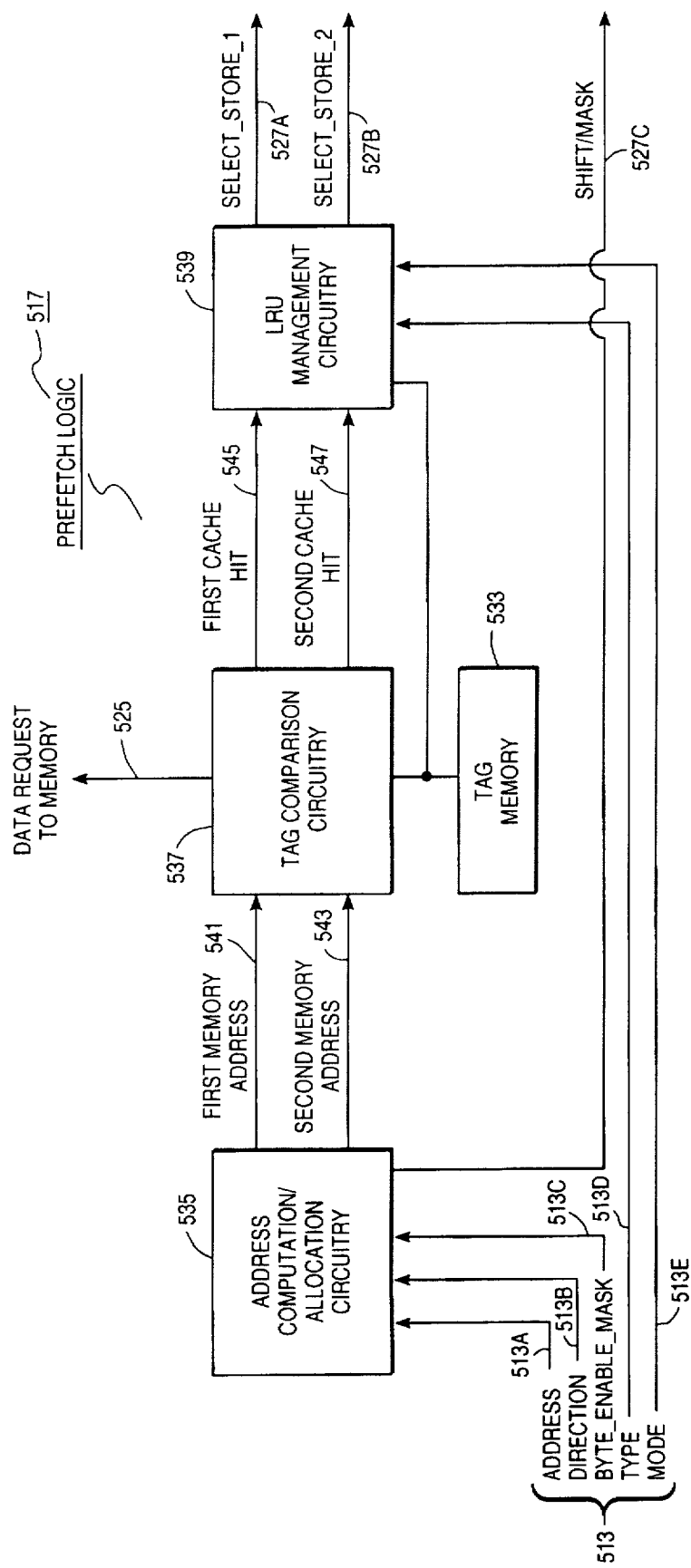
FIG_5

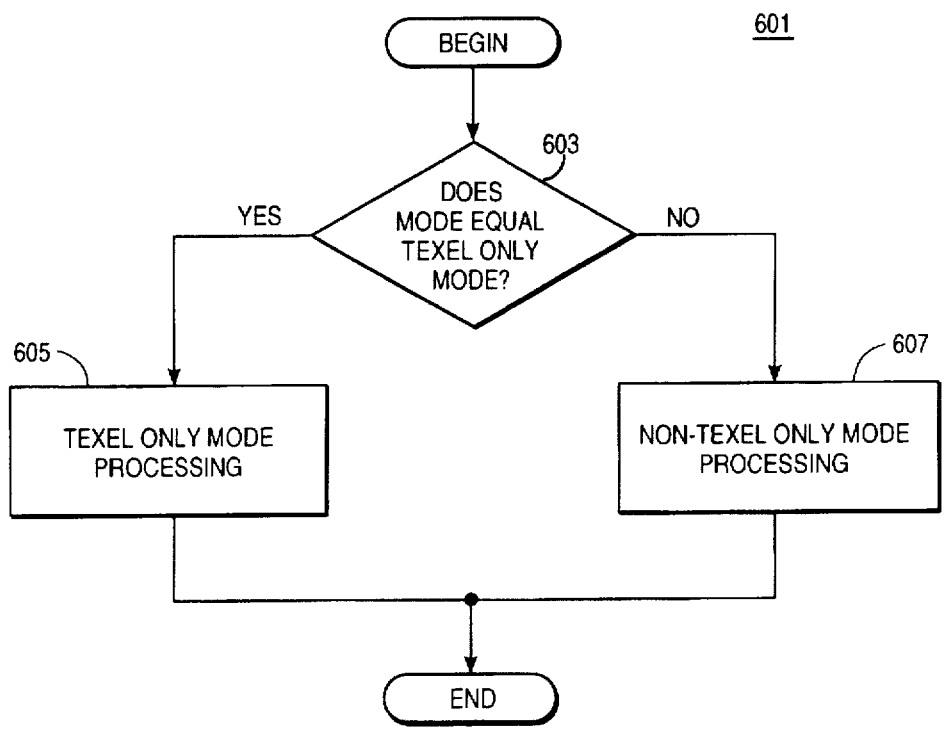
FIG_6A
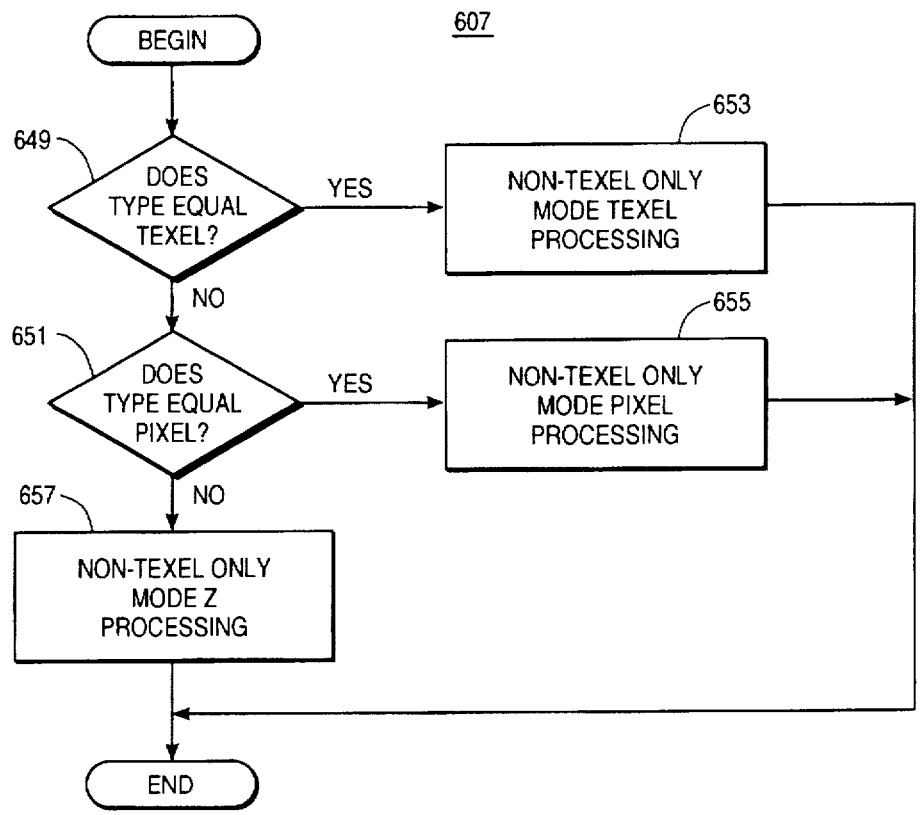
FIG_6C

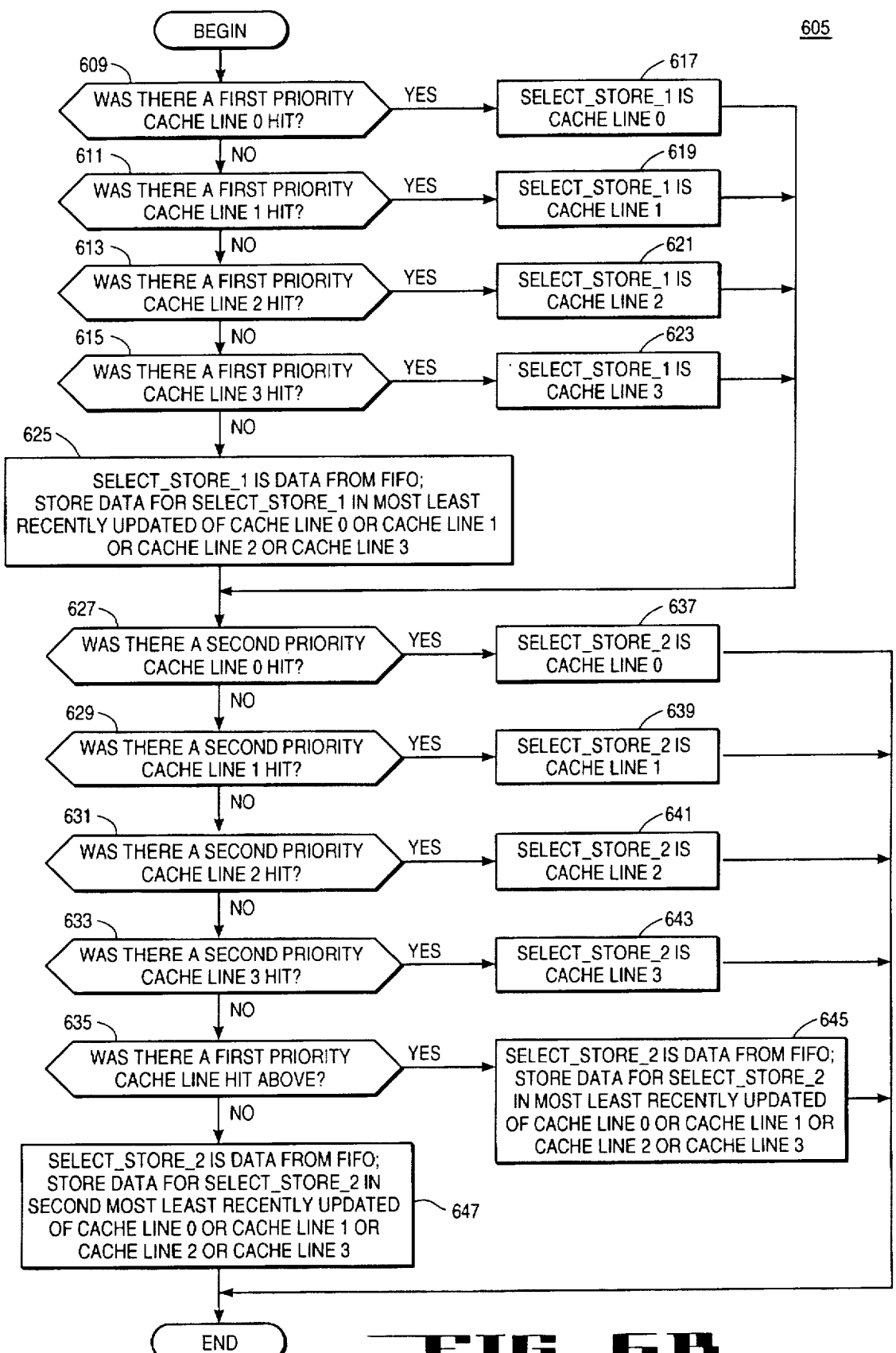
FIG_6B

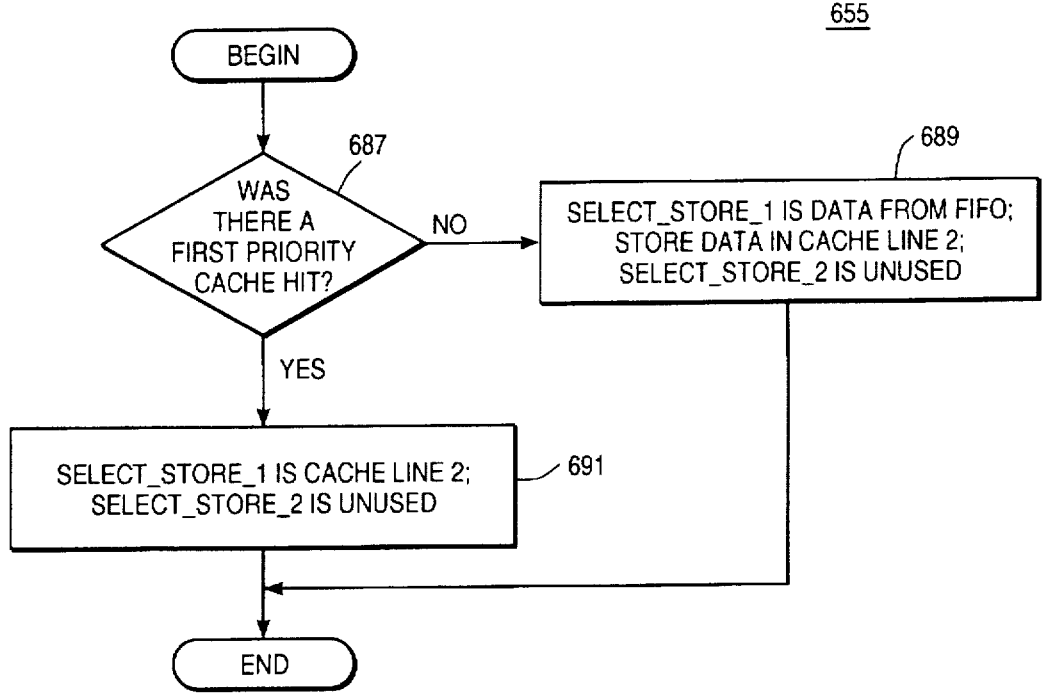
FIG_6E
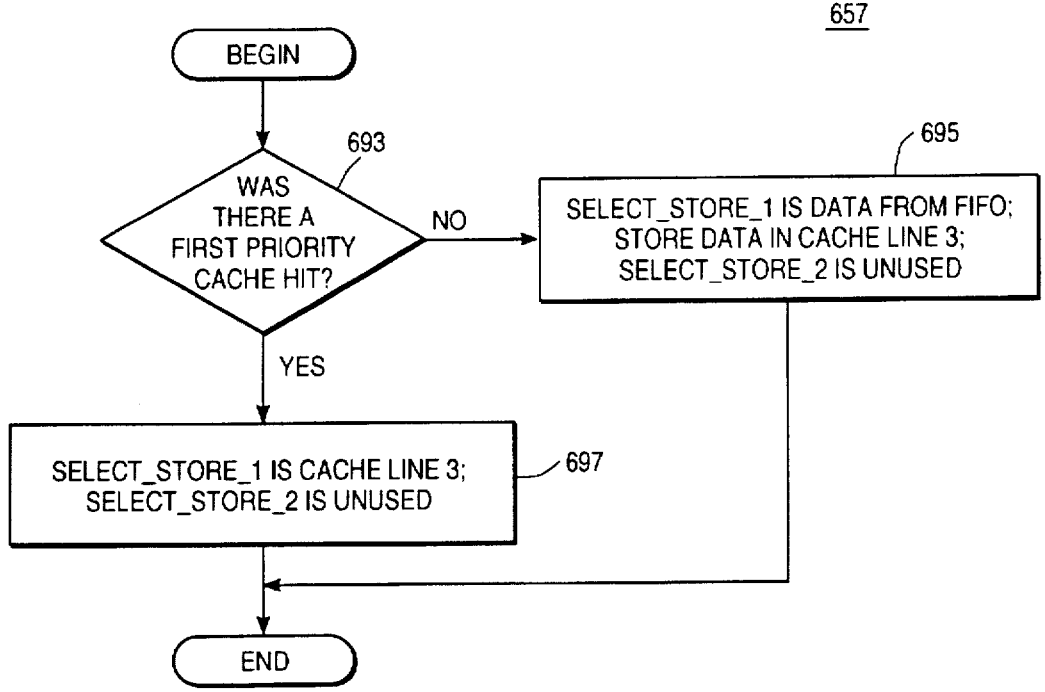
FIG_6F

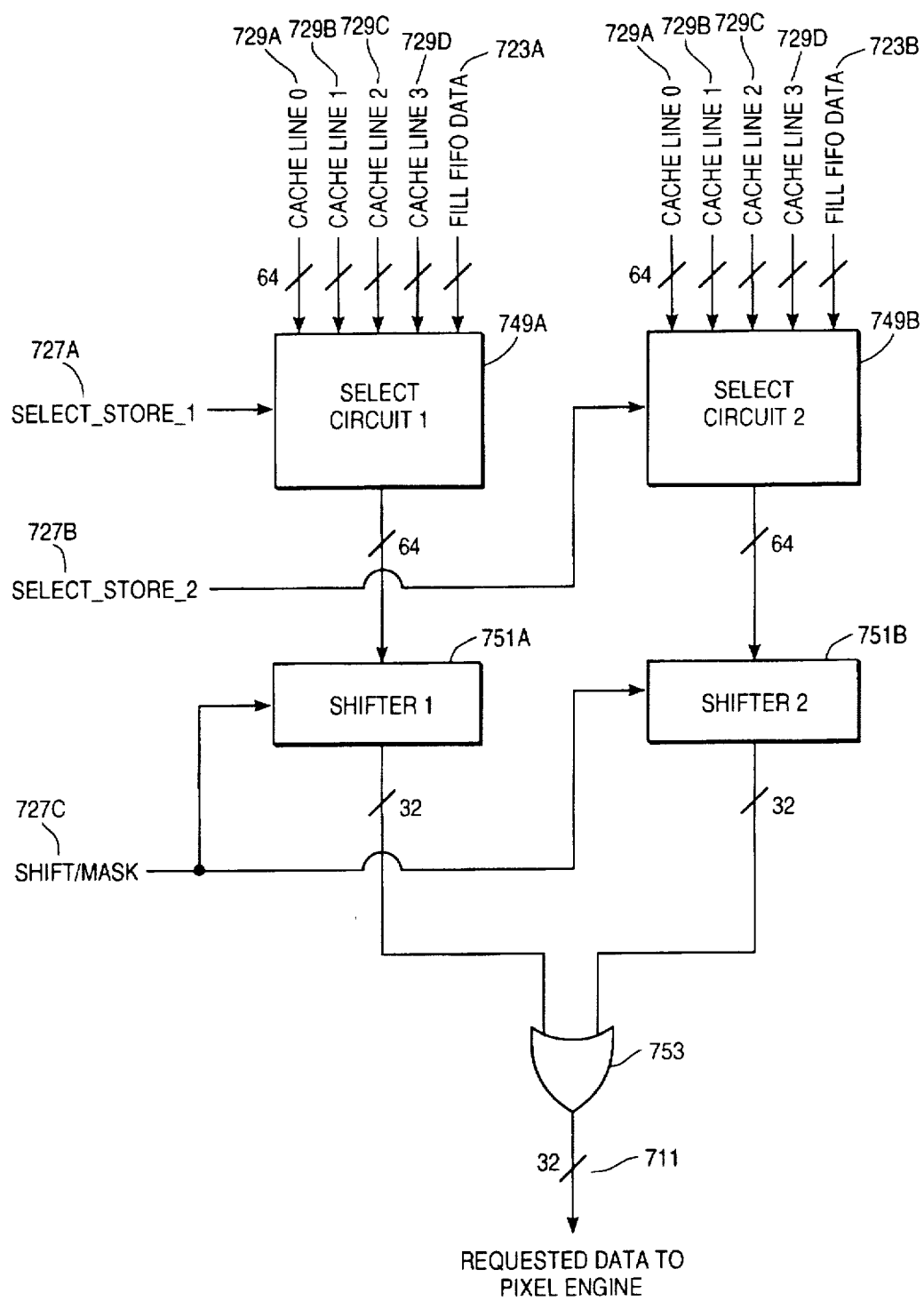
FIG_7

PIXEL ENGINE PIPELINE PROCESSOR DATA CACHING MECHANISM

FIELD OF THE INVENTION

The present invention relates generally to computer systems and more specifically, the present invention relates to graphics computer system caching.

BACKGROUND OF THE INVENTION

Graphics computer systems, such as personal computers and work stations, provide video and graphic images to computer output displays. In recent years, the demands on graphic computer systems have been constantly increasing. Advances in computer technology have made complex graphic images possible on computer displays. Engineers and designers often use computer aided design systems which utilize complex graphics simulations for a variety of computational tasks. In addition, as computer systems become more mainstream, there is an increasing demand for high performance graphics computer systems for home use in multimedia, personal computer gaming, and other applications.

Accordingly, there is also a continuing effort to reduce the cost of high performance graphics computer systems.

One prior art method designers use to increase graphics performance is to implement computer systems with pipeline processors. As is known to those skilled in the art, pipelining exploits parallelism among the tasks in a sequential instruction stream to achieve processing speed improvement.

FIG. 1 illustrates a portion of a prior art graphics computer system 101 implementing a pipelined processor 105 with control circuitry 103 and memory 109. With pipeline processor 105, the execution of tasks from control circuitry 103 are overlapped, thus providing simultaneous execution of instructions. Control circuitry 103 issues a task to stage 0 of pipeline processor 105. The task propagates through the N stages of pipeline processor 105 and is eventually output to memory 109.

As shown in FIG. 1, pipeline processor 105 may need to access memory 109 in order to obtain data information for graphics processing purposes. In FIG. 1, stage M of pipeline processor 105 receives data information through input 111 from memory 109. As is well known in the art, accesses to memory have detrimental effects on overall system performance. Therefore, whenever possible, computer system designers try to minimize the occurrences of memory accesses in high performance graphics computer systems in order to maximize performance.

One prior art solution to minimizing memory accesses is the implementation of a high speed cache memory. As shown in FIG. 1, cache 107 is coupled between pipeline processor 105 and memory 109. Outputs from stage N of pipeline processor 105 are output to cache 107 and are ultimately written to memory 109. Read accesses to memory 109 are cached in cache 107 such that subsequent readings of cached data entries may be read directly from cache 107 instead of memory 109. In particular, if there is a "hit" in cache 107, stage M may receive requested data through input 111 from cache 107 instead of memory 109. Since cache 107 is high speed memory, overall computer system performance is increased as a result of the overall reduction of memory accesses to slow speed memory 109.

The use of prior art cache memories, such as cache memory 107, has a number of detrimental consequences in computer systems. One example is that cache memories are typically very expensive since prior art cache memories generally occupy a substantial amount of substrate area. As a result, designers of low cost graphics computer systems are generally discouraged from including any meaningful cache memory.

Another problem with cache memories in high performance computer graphics systems is that they are not only very expensive, they sometimes do not increase system performance appreciably. One reason for this may be explained by the nature and organization of the specialized data stored in memory for complex graphics applications in particular. Prior art cache memories are generally not optimized to adapt to the different types of graphics data formats utilized in complex high performance graphics computer systems.

Therefore, what is needed is a data caching mechanism which will operate with pipeline-type processors, such as a pixel engine, to reduce the number of memory accesses in a graphics computer system. Such a data caching mechanism would decrease the memory bandwidth required in graphics computer systems to provide maximum performance. In addition, such a data caching mechanism would utilize a minimum number of gates such that circuit substrate area is minimized and therefore reduce overall system cost. Furthermore, such a data caching mechanism would be optimized to accommodate and adapt to different graphics data types or formats in order to provide maximum caching performance in a graphics computer system.

SUMMARY OF THE INVENTION

A method and apparatus for supplying data to a pipelined processor is disclosed. In one embodiment, a pipeline processor configured to process tasks in a graphics computer system is coupled to receive data from a data caching mechanism. As a task propagates through an earlier stage in the pipeline processor, a data request is generated by the earlier stage to the data caching mechanism. As the task propagates through the earlier stage in the pipeline processor to a subsequent stage, the data caching mechanism determines where to access the requested data and then obtains the requested data. When the task reaches the subsequent stage of the pipeline processor, the data caching mechanism provides the requested data to the subsequent stage of the pipeline processor. Since the earlier stage of the pipeline processor makes the request for data in advance, prior to the time the requested data actually needed by the subsequent stage, memory access lag time is eliminated. Additional features and benefits of the present invention will become apparent from the detailed description, figures and claims set forth below. Other features and advantage of the present invention will be apparent from the accompanying drawings and from the detailed description which follows below.

BRIEF DESCRIPTION OF THE DRAWINGS

The present invention is illustrated by way of example and not limitation in the accompanying figures.

FIG. 1 is an illustration of a simplified prior art computer system implementing a pipeline processor and cache memory.

FIG. 2 is a block diagram of a computer system in accordance with the teachings of the present invention.

FIG. 3 is a block diagram of one embodiment of a pixel engine data caching mechanism in accordance with the teachings of the present invention.

FIG. 4 is an illustration of a desired data entry existing on a double word boundary in memory.

FIG. 5 is an illustration in block diagram form of one embodiment of prefetch logic in accordance with the teachings of the present invention.

FIGS. 6A through 6F illustrate a flow chart representing the process flow of the LRU replacement policy utilized in one embodiment of a pixel engine data caching mechanism in accordance with the teachings of the present invention.

FIG. 7 is an illustration in block diagram form of one embodiment of the shifting and merging logic utilized in fetch logic in accordance with the teachings of the present invention.

DETAILED DESCRIPTION

Figure 6D:
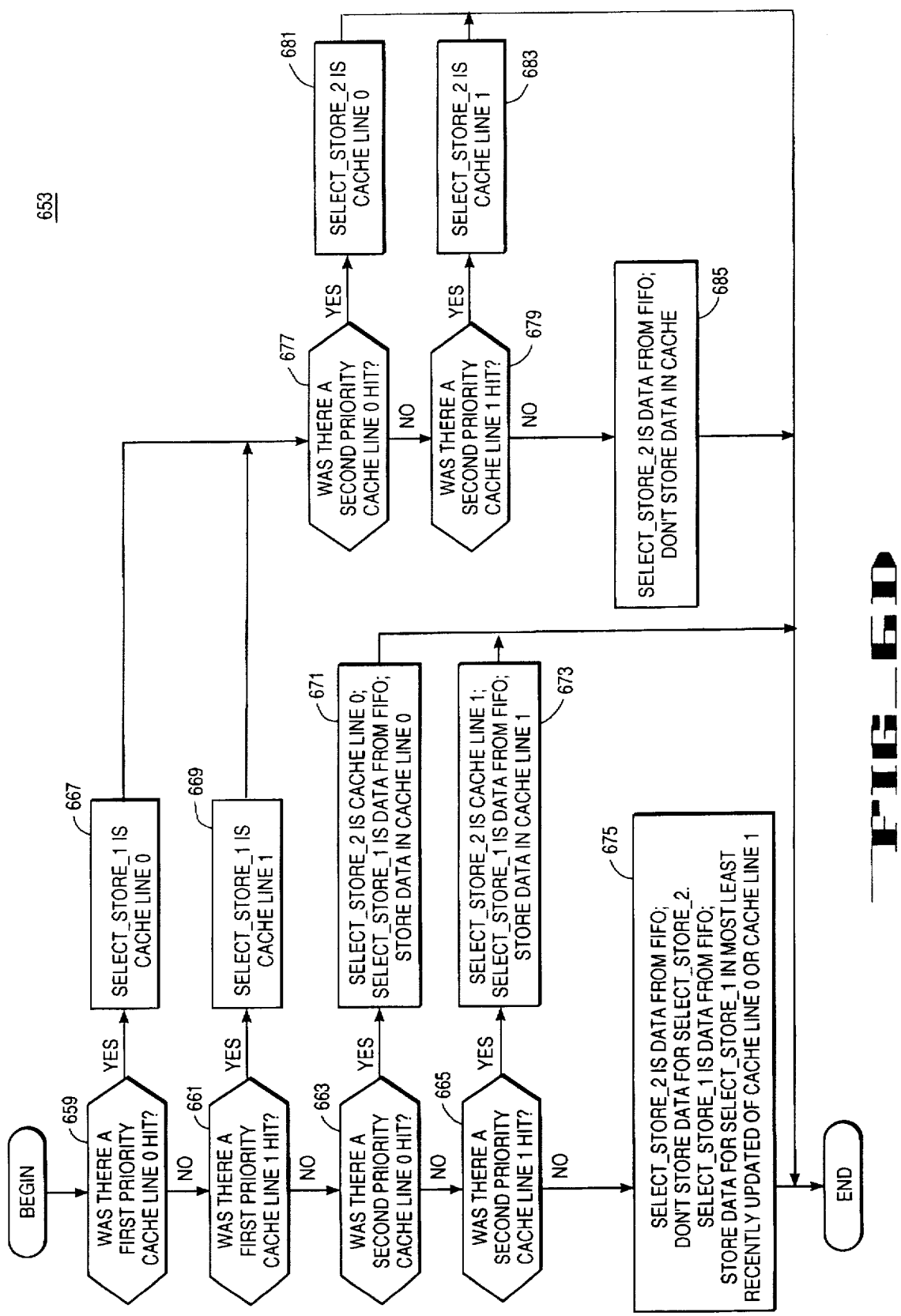

A method and an apparatus for supplying requested data to a pipelining processor is disclosed. In the following description, numerous specific details are set forth such as data types, word lengths, etc. in order to provide a thorough understanding of the present invention. It will be obvious, however, to one having ordinary skill in the art that the specific details need not be employed to practice the present invention. In other instances, well known materials or methods have not been described in detail in order to avoid unnecessarily obscuring the present invention.

The present invention described herein reduces the number of memory requests in a graphics computer subsystem by employing a pixel engine data caching mechanism for the various data types or formats which may be utilized in graphics computer systems. With the optimization employed in the present data display caching mechanism described herein, minimal circuit substrate area is utilized, thus keeping overall computer system costs down. In addition, the present invention maximizes computer system throughput by utilizing a pipeline processor which, with the presently described pixel engine data caching mechanism, receives requested data with virtually no lag time. Accordingly, the present invention helps to provide a low cost high-performance graphics computer system with reduced memory access bandwidth.

In FIG. 2, the present invention is illustrated in block diagram form. Computer system 201 includes a central processing unit (CPU) 204 coupled to system memory 206 and communications bus 208. Graphics subsystem 202 communicates CPU 204 through communications bus 208. The output graphics and video of computer system 201 are displayed on output display 214 which is coupled to video output circuitry 212 of graphics subsystem 202. Graphics subsystem 202 also includes bus interface circuitry 210 coupled to communications bus 208. Control circuitry 203 is coupled to bus interface 210. For increased system performance, pipeline processor 205 is coupled to control circuitry 203 and generates output information which is stored in local memory circuitry 209. Pixel engine data caching mechanism 215 is coupled to receive data request 213 information from pipeline processor 205 and, in response, generates requested data 211 to pipeline processor 205. Video output circuitry 212 reads the data information from local memory circuitry 209 and then outputs the corresponding images on output display 214.

In one embodiment of the present invention, bus interface circuitry 210 is PCI interface circuitry. In that embodiment, control circuitry 203 includes a reduced instruction set computer (RISC) and the corresponding support circuitry such as an instruction cache as well as VGA compatible circuitry. Local memory circuitry 209 includes local dynamic random access memory (DRAM) as well as associated support circuitry such as refresh circuitry and a memory controller. Video output circuitry 212 includes a cathode ray tube controller (CRTC) as well as a video first-in first-out memory (FIFO). In that embodiment, all devices in graphics subsystem 202, with the exception of DRAM (not shown) exist on a common substrate.

As shown in FIG. 2, pipeline processor 205 receives tasks to execute from control circuitry 203 at input 216 of stage 0. Stage 0 performs corresponding operations and upon completion, the task propagates to the next stage in pipeline processor 205. After stage 0 has completed processing with respect to the task, stage 0 is ready to receive the next task from control circuitry 203. Thus, when all N stages in pipeline processor 205 are performing operations on associated tasks, the N tasks are, in effect, being processed simultaneously. After a task sequentially propagates through all N stages of pipeline processor 205, the resulting output information is generated from output 218 of stage N and stored in local memory circuitry 209.

It is appreciated that once a particular task enters pipeline processor 205, certain data entries in local memory circuitry 209 which may be required for processing in subsequent stages of the pipeline may be known in advance. For instance, referring to FIG. 2, assume that a task has entered stage 0 of pipeline processor 205. The task propagates pipeline processor 205 to stage A. At stage A, it is known that stage M of pipeline processor 205 will need particular data information when the task eventually propagates to stage M. The fact that the data will be needed by stage M is known even though the particular task has not yet propagated to stage M.

The present invention exploits this characteristic of pipeline processing by providing pixel engine data caching mechanism 215 which is configured to received data request 213 from stage A. In response to data request 213, pixel engine data caching mechanism knows in advance data information which will be required by stage M. Thus, pixel engine data caching mechanism 215 may access local memory circuitry 209 to fetch the requested data, if necessary, while the task propagates through pipeline processor 205 to stage M. When the task finally reaches stage M, pixel engine data caching mechanism 215 supplies the requested data 211 to stage M of pipeline processor 205. Accordingly, since the required data information should already be available for stage M as soon as the task arrives, any lag time normally required for memory is effectively eliminated. If for some reason the requested data is not ready for stage M as soon as the task arrives, memory lag time is at least reduced with the simultaneous processing of pixel engine data caching mechanism 215 and pipeline processor 205.

It is appreciated that FIG. 2 merely provides an example embodiment of the present invention in that the data request signal 213 originates only from stage A of pipeline processor 205 and that requested data 211 is provided only to stage M of pipeline processor 205. Data request signals 213 may originate from any number of stages of pipeline processor 205 and requested data 211 may be provided to any number of stages in pipeline processor 205. The present invention is applicable for any pipeline process in which requested information from memory for subsequent stages in the pipeline processor are known in advance.

In addition, it is further appreciated that cache memory may be implemented in pixel engine data caching mechanism 215 in order to reduce memory access bandwidth from local memory circuitry 209. Although pixel engine data caching mechanism 215 already eliminates memory access lag time to stage M of pipeline processor 205, a reduced number of memory accesses of local memory circuitry 209 from pixel engine data caching mechanism 215 will help to increase overall system performance.

FIG. 3 shows one embodiment of pixel engine data caching mechanism 315 in block diagram form. Pixel engine data caching mechanism 315 includes prefetch logic 317 coupled to intermediate queue 319 which is coupled to fetch logic 321. Data request 313 is received by prefetch logic 317 from pipeline 205 of FIG. 2. Prefetch logic 317 is configured to generate data request to memory 325 which is received by local memory circuitry 309. In response to the data request to memory 325, local memory circuitry 309 outputs data which is received by fill FIFO 323 and then provided to fetch logic 321. Fetch logic 321 supplies the requested data 311 to pipeline 205.

As shown in FIG. 3, data request from pipeline 313 includes address signal 313A, direction signal 313B, byte enable mask signal 313C, type signal 313D and mode signal 313E. These signals are described in Table 1 below:

TABLE 1

| SIGNAL | # BITS | DESCRIPTION |
|---|---|---|
| ADDRESS | 24 bits | Starting byte memory address of desired data |
| DIRECTION | 1 bit | Flag indicating reading direction |
| BYTE_ENABLE_MASK | 4 bits | Byte enable mask indicating the desired bytes of requested 32 bit word |
| TYPE | 2 bits | Type of read request<br>0 = texel data<br>1 = pixel data<br>2 = Z data<br>3 = texel only data |
| MODE | 1 bit | Flag indicating texel only mode |

In one embodiment of the present invention, address signal 313A is a 24 bit signal which represents the starting byte address where the requested data is located in local memory circuitry 309. In the embodiment, memory entries are organized into 64 bit double words and the requested data is supplied to the pipeline processor are 32 bit, or four byte. words. It is appreciated that other embodiments of the present invention may retrieve other than 64 bit double words from memory and/or supply other than 32 bit words to a requesting pipeline processor.

Direction signal 313B is a one bit flag indicating the particular direction in which data is being read from local memory circuitry 309. For example, if a scan line is being updated in local memory circuitry 309, individual data entries, e.g. pixels, in the scan line may be updated from left to right or right to left. As will be discussed in more detail below, organization of cache memory 329 of the present invention is optimized with respect to the direction in which data entries are being read from local memory circuitry 309 as indicated by direction signal 313B.

Byte enable mask signal 313C is a four bit signal indicating which bytes starting from the given starting byte address address are requested from by the pixel engine.

Type signal 313D is a two bit signal indicating the type of read request. In particular, in one embodiment of the present invention, different data formats or types are utilized. In the embodiment, a type signal of "0" represents a texel data read request. A type signal of "1" represents a pixel data read request. A type signal of "2" represents a Z data request. Finally, a type signal of "3" represents a texel data request corresponding with the pipeline processor operating in a texel only mode.

Mode signal 313E is a flag indicating whether the pipeline processor of the present invention is operating in a texel only mode. In one embodiment of the present invention, the pipeline processor may either operate in a texel only mode in which only texel information is processed by the pipelined processor. In a non-texel only mode, the pipelined processor of the present invention may process texels, pixels or Z information. As will be discussed in more detail below, the cache memory 329 of the present invention is optimized to adapt its configuration in response to either mode the pipeline processor may be operating in at any time.

As shown in FIG. 3, prefetch logic 317 includes tag memory 333. Tag memory 333 contains the local memory addresses, or tags, of data entries stored in cache memory 329 at any particular time. In one embodiment of the present invention, cache memory 329 includes four line buffers containing double word entries from local memory circuitry 309. Accordingly, tag memory 333 contains the corresponding double word memory addresses of the data entries contained in the four line buffers of cache memory 329. It is appreciated that other embodiments of the present invention may feature more or less than four line buffers.

FIG. 5 is an illustration of prefetch logic 517 in block diagram form. After prefetch logic 517 receives data request 513 from the pipeline processor 205, address computation/allocation circuitry 535 computes the address, or addresses if necessary, of the requested data entries from local memory circuitry 309. With a given address and knowledge of the requested bytes, as indicated by address signal 513A and byte enable mask signal 513C, address computation/allocation circuitry 535 is able to determine whether one or two double words must be fetched from local memory circuitry 309 in order to ultimately provide the requested data 311 to the pipeline 205. Furthermore, if two double words must be fetched from local memory circuitry 309, address computation/allocation circuitry 535 is able to determine how the double words must be shifted and masked in order to provide requested data 311.

FIG. 4 is an illustration which helps to explain the process performed by address computation/allocation circuitry 535. Assume that local memory circuitry 401 contains byte information stored in address locations 0–15, as shown in FIG. 4. Now assume for example that the requested data 403 is located in local memory circuitry 401 at byte locations 7–10. Accordingly, starting byte memory address 411 would point to byte 7. If the requested data 403 exists on a double word boundary 409, as shown in FIG. 4. both the first double word 405 and the second double word 407 must be fetched from local memory circuitry 401 in order to obtain all four bytes (7–10) of requested data 403. Therefore, the first double word 405, beginning at address 0, and the second double word 407, beginning at address 8 must be fetched from local memory circuitry 401 in order to obtain requested data 403. If, for example, all four bytes of requested data 403 are located in byte locations 0–7 of the first double word 405, then only first double word 405 would need to be fetched from local memory circuitry 401 in order to obtain requested data 403. Similarly, if all four bytes of requested data 403 exist in memory locations 8–15 of second double word 407, then only the second double word 407 would need to be fetched from local memory circuitry 401 in order to obtain requested data 403.

After the starting double word addresses are determined, the addresses are then prioritized by address computation/allocation circuitry 535. The prioritization is performed in order to determine how the fetched double words will be later cached in cache memory 329. If only one double word needs to be fetched from local memory circuitry 309, that one double word is obviously going to be assigned the highest priority. If, however, two double words must be fetched from local memory circuitry 309, then one of the two double words will be assigned a higher priority for caching purposes.

To illustrate, refer back to FIG. 4. In this example, assume that both first double word 405 and second double word 407 must be fetched from local memory circuitry 401. If data is being read from local memory circuitry 401 from right to left, then first double word 405 will be assigned the highest priority. If, however, double word entries are being read from local memory circuitry 401 from left to right, then second double word 407 will be assigned the highest priority.

The prioritization scheme employed by address computation/allocation circuitry 535 of the present invention takes advantage of the fact that if memory is being read from right to left, there is less likelihood that the right most double word needs to be cached and an increased likelihood that the left most double word will be accessed again in a subsequent memory access. Conversely, if double word entries are being read from local memory circuitry 401 from left to right, there is less likelihood that the left most double word will be accessed again and that there is an increased likelihood that the right most entries will be accessed in a subsequent memory access. Directional reading of memory may be pertinent when accessing memory entries for scan line purposes or the like.

As described above, address computation/allocation circuitry 535 is notified of the direction in which memory is being accessed with direction signal 313B. As shown in FIG. 5, after address computation/allocation circuitry 535 determines the two memory addresses as well as prioritizes the two memory addresses, the highest priority memory address is output as first memory address 541. The other memory address, if needed, is output as second memory address 543. The two memory address signals 541 and 543 are received by tag comparison circuitry 537.

Tag comparison circuitry 537 performs a comparison of the first and second memory addresses 541 and 543 with the double word addresses stored in tag memory 533. The double word addresses stored in tag memory 533 correspond with double words cached in cache memory 329 of FIG. 3. If there is a match between the double word addresses computed by address computation/allocation circuitry 535 and an address stored in tag memory 533, there is a cache "hit." Accordingly, no additional access to local memory circuitry 309 is necessary since the requested data is already stored in cache memory 329. Thus, memory bandwidth is therefore improved with the present invention. It is noted that tag comparison circuitry 537 determines whether there is a cache "hit" for both first memory address signal 541 and second memory address signal 543 in tag memory 533.

If there is no cache "hit" and data does in fact need to be fetched from local memory circuitry 309 of FIG. 3, tag comparison circuitry 537 generates a corresponding data request to memory 525. Tag comparison circuitry 537 also generates first cache hit signal 545 and second cache hit signal 547. First cache hit signal 545 indicates to least recently updated (LRU) management circuitry 539 whether or not first memory address 541 exists in cache memory 329. If first cache memory address 541 does in fact exist in cache memory 329, first cache hit signal 545 also indicates which particular cache line entry corresponds with first memory address 541. Similarly, second cache hit signal 547 indicates whether or not there was a cache hit associated with second memory address signal 543 and which cache line entry in cache memory 329 corresponds with second memory address 534 if there was a cache hit.

As mentioned above, in one embodiment of the present invention, pipelined processor 205 has two modes of operation, texel only mode and non-texel only mode. LRU management circuitry 539 determines which mode pipeline processor 205 is operating in by monitoring mode signal 513E. If mode signal 513 indicates that pipeline processor is operating in texel only mode, LRU management circuitry 539 allocates all cache lines in cache memory 329 for texel information. However, if mode signal 513E indicates that pipeline processor 205 is operating in non-texel only mode, LRU management 539 allocates a portion of the cache memory lines in cache memory 329 for texel information, while other portions of cache memory 329 are allocated for pixel information as well as Z information.

Accordingly, the cache memory of the present invention adapts to the particular mode in which pipeline processor 205 is operating in order to dynamically optimize cache memory 329 for the particular mode in which pipeline processor 205 is operating.

In one embodiment, if pipeline processor is operating in texel only mode, all four line buffers of cache memory 329 are allocated for texel information. If pipeline processor is operating in non-texel only mode, LRU management circuitry 539 allocates two of the four line buffers in cache memory 329 for texel information, one of the line buffers for pixel information and one line buffer for Z information.

If more than one cache line entry in cache memory 329 is allocated for any particular type of data, such as the two or four lines being allocated to texel information, the LRU management circuitry 539 employs an LRU algorithm when replacing cache lines in cache memory 329. Therefore, depending on the data type being stored in cache memory 329, the most "stale" or most least recently updated, line buffer is replaced. In some circumstances, LRU management circuitry 539 has been optimized to have the intelligence not to replace any cache memory 329 entries with requested data. This circumstance would occur if a particular double word has been fetched from local memory circuitry 309 which would not be needed again, based on direction information indicated by direction signal 313B.

After LRU management circuitry 539 determines where double word entries will be obtained, i.e. either from local memory circuitry 309 or cache memory 329, and after LRU management circuitry 539 determines where the double word entries may be stored, i.e. which particular cache memory line in cache memory 329, LRU management circuitry 539 outputs SELECT_STORE_1 signal 527A and SELECT_STORE_2 signal 527B as shown in FIG. 5. SELECT_STORE_1 527A and SELECT_STORE_2 527B are output by prefetch logic 517 as well as shift/mask 527C to intermediate queue 319 of FIG. 3.

FIGS. 6A through 6F illustrate a flow chart 601 showing the process flow of one embodiment of LRU management circuitry 539. As shown in FIG. 6A, decision block 603 determines whether or not the pipeline processor is operating in texel only mode. If the pipeline processor is operating in texel only mode, processing block 605 is executed.

Otherwise, if pipeline processor is operating in non-texel only mode, process block 607 is executed.

FIG. 6B shows the process of texel only mode processing block 605. First, it is determined whether there is a cache line hit for the first priority memory address as shown in decision blocks 609–615. If there was a hit in any of the cache lines, SELECT_STORE_1 is assigned a value corresponding with the particular cache line in which there was a hit, as indicated in processing blocks 617–623. If there was no cache hit in any of the cache lines, SELECT_STORE_1 is assigned value indication that data will be obtained from local memory through the FIFO, as shown in processing block 625. In addition, the data received from the FIFO replaces the most least recently updated, or the most "stale," cache line.

After the processing for the first priority address is completed it is determined whether there was a cache hit in relation to the second priority memory address, as shown in decision blocks 627–633. If there was a cache hit, SELECT_STORE_2 is assigned value corresponding with the particular cache line hit as shown in processing blocks 637–643. If there was no cache line hit for the second priority memory address, SELECT_STORE_2 is assigned value indicating that data is to be received from the FIFO. In addition, if there was a hit in decision blocks 609–615, the data received from the FIFO indicated in SELECT_STORE_2 replaces the most least recently updated cache line. If, on the other hand, there was not a cache line hit associated with decision blocks 609–615, the data received from the FIFO indicated in SELECT_STORE_2 replaces the second most least recently updated cache line, as shown in decision block 635 and processing blocks 645 and 647.

FIG. 6C shows the processing associated with non-texel only mode processing 607. First it is determined whether the data format of the read request is a texel type, pixel type, or Z type, as shown in decision blocks 649 and 651. If the read type is a texel type, non-texel only mode processing block 653 is executed. If the read type is a pixel type, then non-texel only mode pixel processing block 655 is executed. Finally, if the read type is neither texel type nor pixel type, then non-texel only mode Z processing block 657 is executed.

FIG. 6D shows the processing for non-texel only mode texel processing block 653. First it is determined whether there is a cache hit associated with the first priority memory address as shown in decision blocks 659 and 661. If there was a cache line hit associated with the first priority memory address, SELECT_STORE_1 is assigned a value corresponding with the hit cache line, as shown in processing blocks 667 and 669. After SELECT_STORE_1 is assigned a value in the case of a first priority memory address hit, it is determined whether there was a cache line hit associated with the second priority memory address, as shown in decision block 677–679. If there was also a cache hit associated with this second priority memory address, then SELECT_STORE_2 is assigned a value corresponding with the hit cache line, as indicated by processing blocks 681 and 683. If there was no second priority memory address cache hit in this situation, then SELECT_STORE_2 is assigned a value indicating that data is to be received from the FIFO, as shown in processing block 685. In addition, the data received from the FIFO indicated in SELECT_STORE_2 is not stored in the data cache. Since SELECT_STORE_2 corresponds with the low priority double word, it has been predetermined that the particular double word will not be cached in memory.

Assuming there was not a first priority memory address cache hit, it will then be determined whether there is a second priority memory address cache hit, as indicated in decision blocks 663 and 665. If there is a second priority memory address cache hit, and there is no first priority memory cache hit, SELECT_STORE_2 is assigned a value corresponding with the hit cache line and SELECT_STORE_1 is assigned a value indicating that data is to be received from the FIFO, as indicated in processing blocks 671 and 673. In addition, the data received from the FIFO is designated to replace the data in the cache line which had been indicated in SELECT_STORE_2. This can be explained by the fact that the data indicated in SELECT_STORE_2 has already been determine to be a low priority double word and therefore, the low priority double word will be replaced by the high priority double word being fetched from the FIFO. If there was no first priority memory cache hit or second priority memory cache hit, SELECT_STORE_2 is assigned a value indicating that data is to be received from the FIFO and that the data will not be stored in the cache memory. Furthermore, SELECT_STORE_1 will also be assigned a value indicating that data is to be received from the FIFO and that the data will be stored in the most least recently updated cache line between cache line 0 and cache line 1, as shown in processing block 675. It is noted that in this particular embodiment, cache lines 0 and 1 of cache memory are allocated for texel information.

FIG. 6E shows the processing associated with non-texel only mode pixel processing block 655. As shown in FIG. 6E, it is first determined whether there was a cache hit associated with the first priority memory address. If there was, SELECT_STORE_1 is assigned a value corresponding with cache line 2 as shown in processing block 691. If there was no first priority memory address hit, SELECT_STORE_1 is assigned a value indicating that data is to be received from the FIFO and that the data will replace the data in cache line 2, as shown in processing blocks 689. It is noted that in this particular embodiment, cache line 2 is dedicated to pixel information.

FIG. 6F shows the processing associated with non-texel only mode Z processing block 657. First, it is determined whether there was a cache hit associated with first party memory address as shown in decision block 693. If there was a hit, SELECT_STORE_1 is assigned a value corresponding with cache line 3. If there was no hit, SELECT_STORE_1 is assigned a value indicating that data will be received from the FIFO and that the data will be stored in cache line 3. It is noted that in non-texel only mode, cache line 3 is dedicated to Z information.

Referring back to FIG. 3, the outputs of prefetched logic 317 are shown as SELECT_STORE_1 327A, SELECT_STORE_2 327B and shift/mask 327C. In one embodiment of the present invention, each of these three signals are four bit signals. Intermediate queue 319 is configured to receive SELECT_STORE_1 327A, SELECT_STORE_2 327B and shift/mask 327C and passes the signals on to fetch logic 321 as shown in FIG. 3. In one embodiment of the present invention, intermediate queue is a FIFO. The signals are simply queued in intermediate queue 319 in a manner such that requested data 311 will be supplied to the pipeline when the particular task making the request reaches stage M of pipeline 205.

As shown in FIG. 3, fetch logic 321 includes cache memory 329 and shifting/merging logic 331. With the received signals SELECT_STORE_1 327A, SELECT_STORE_2 372B and shift/mask 327C, shifting/merging logic 331 knows: (1) whether one double word or two double words will be needed for requested data 311; (2) whether the first priority double word will be retrieved from cache memory 329 or fill FIFO 323; (3) which cache line the first double word will be stored in if the double word is not already cached in cache memory; (4) if the second priority double word is needed, whether the second priority double word will come from cache memory 329 or from fill FIFO 323; (5) which cache line, if any, the second double word will be stored in; and (6) how to shift and merge the first and second double words (if necessary) to construct properly requested data 311.

FIG. 7 shows in block diagram form shifting/merging logic 731. As shown in FIG. 7, select circuit 1 749A and select circuit 2 749B are coupled to receive 64 bit double word values from cache line 0 729A, cache line 1 729B, cache line 2 729C, cache line 3 729D and FIFO data 723A and 723B. Select circuit 1 729A is coupled to receive SELECT_STORE_1 727A. Select circuit 2 749B is coupled to receive SELECT_STORE_2 727B. In the embodiments shown in FIG. 7, both select circuit 1 749A and select circuit 2 749B can be thought of as simple multiplexor selection circuits. That is, based on the corresponding input of SELECT_STORE_1 727A and SELECT_STORE_2 727B, one of the five 64-bit input signals will be output. As shown in FIG. 7, the output in select circuit 1 749A is coupled to shifter 1 751 A. Similarly, the output of select circuit 2 749B is coupled to shifter 2 751 B. Shifter 1 751A and shifter 751 B are coupled to receive shift/mask 727C. The 32-bit outputs of shifter 1 751A and shifter 2 751 B are logically ORed together with logic OR circuit 753 to generate the 32-bit requested data 711 to pipeline 205.

To illustrate the function of shifter 1 751 A and shifter 2 751 B refer back to FIG. 4 and Table 2 below.

TABLE 2

| Case | First Double Data Word | Second Double Data Word (Derived) |
|------|------------------------|-----------------------------------|
| 1    | 0                      | 567                               |
| 2    | 01                     | 67                                |
| 3    | 012                    | 7                                 |
| 4    | 0123                   | —                                 |
| 5    | 1234                   | —                                 |
| 6    | 2345                   | —                                 |
| 7    | 3456                   | —                                 |
| 8    | 4567                   | —                                 |
| 9    | 567                    | 0                                 |
| 10   | 67                     | 01                                |
| 11   | 7                      | 012                               |

In this example, assume that the requested data 403 exists at memory addresses 7-10 in local memory circuit 401. As shown in FIG. 4, the requested data 403 exists on a double word boundary 409. In this example, assume further that the direction in which data is being read from local memory circuit 401 is from right to left. Accordingly, the first priority double word will be first double word 405 and the second priority double word will be second double word 407.

In this example, the requested data 403 corresponds with case number 11 shown in the last row of Table 2 above. Accordingly, shift/mask 727C of FIG. 7 will contain a value corresponding with case 11. As shown in Table 2, the first double data word column shows in case 11 that if byte number 7 of the first double word is requested, the corresponding second double data word bytes will be bytes 0, 1, and 2. Referring back to FIG. 4, bytes 0, 1, and 2 of second double word 407 correspond with bytes 8, 9, and 10 in local memory circuit 401. Thus, referring back to FIG. 7, continuing with the present example, shifter 1 751A receiving case 11 from shift/mask 727C will shift the 64-bit input in a manner such that the bits corresponding with byte 7 of the input 64 bits is shifted to appear as the first byte of the output 32-bit signal from shifter 1 751 A, which is received by local OR input 753. Similarly, shifter 2 will also receive a value in shift/mask 727C corresponding with case 11 such that the 0, 1, 2 bytes of the input 64-bit data are shifted to appear as the second, third, and fourth bytes in the output 32-bit signal from shifter 2 751 B which is received by logical OR circuit 753.

It is appreciated that the example given above can also be applied to the other ten cases of Table 2 not discussed. For example, if shift/mask 727C were assigned the value corresponding with case 10 of Table 2, the input 64-bit data stream to shifter 1 751A would be shifted in manner such that bytes 6 and 7 would appear as the first two bytes of the output 32-bit word. Similarly, bytes 0 and 1 of the input 64-bit data stream to shifter 2 would be shifted in manner to appear as the last two bytes of the output 32-bit signal from shifter to 751 B. Accordingly, referring back to FIG. 2, the requested data 211 will be output from pixel engine data caching mechanism 215 to stage M of pipeline processor 205.

Therefore, an apparatus and a method for providing requested data to a pipeline processor has been described. With the present invention, memory bandwidth is effectively reduced in a graphics computer system by caching data to reduce the number of required memory accesses. In addition, the present invention employs an adaptive cache optimized to maximize the performance of the associated computer graphics system based on the particular mode in which the pipeline processor may be operating. In the described embodiment, if the pipeline processor is operating in a texel only mode, the cache is optimized to allocate all the cache lines for texel information. If, on the other hand, the pipeline processor is operating in a non-texel only mode, two of the four cache lines are allocated for texel information while one of the cache lines is dedicated for pixel information and the last cache line is dedicated for Z information. Furthermore, the present invention employs an innovative replacement algorithm in the cache memory based on the direction in which data is being read from the memory as well as the particular mode the pipeline processor is operating in at any particular time. With this intelligent replacement algorithm, memory accesses are further reduced, thus further increasing the available memory bandwidth in the computer system. It is appreciated that the present invention employs a data caching mechanism without the need to employ a large and expensive prior art cache memory.

In the foregoing detailed description, an apparatus and a method for providing requested data to a pipeline processor is described. The apparatus and method of the present invention has been described with reference to specific exemplary embodiments thereof. It will, however, be evident that various modifications and changes may be made thereto without departing from the broader spirit and scope of the present invention. The present specification and drawings are accordingly to be regarded as illustrative rather than restrictive.

What is claimed is:

1. In a pipeline processor configured to process a task, the task propagating through an earlier stage and then a subsequent stage in the pipeline processor, a device for supplying requested data to the subsequent stage comprising:

a data request signal generated by the earlier stage for the requested data to be supplied to the subsequent stage, the data request signal generated by the earlier stage with respect to the task after the task propagates to the earlier stage and before the task propagates to the subsequent stage; and a data caching mechanism configured to to begin fetching the requested data in response to the data request signal from the earlier stage before the task propagates to the subsequent stage, the data caching mechanism configured to supply the requested data to the subsequent stage with respect to the task after the task propagates to the subsequent stage.

2. The device described in claim 1 wherein the data caching mechanism comprises a cache memory configured to cache data.

3. The device described in claim 2 wherein the pipeline processor is configured to have a first mode of operation and a second mode of operation.

4. The device described in claim 3 wherein the data comprises a first type of data and a second type of data.

5. The device described in claim 4 wherein the cache memory is configured to cache only the first type of data when the pipeline processor is configured to operate in the first mode.

6. The device described in claim 5 wherein the cache memory is further configured to cache only the first type of data in a first portion of the cache memory and only the second type of data in a second portion of the cache memory when the pipeline processor is configured to operate in the second mode.

7. The device described in claim 3 wherein the data request signal comprises a mode signal, the mode signal indicating whether the pipeline processor is operating in the first mode or in the second mode.

8. The device described in claim 6 wherein the data caching mechanism further comprises:

prefetch logic coupled to the cache memory and coupled to receive the data request signal, the prefetch logic configured to ascertain whether the requested data is cached in the cache memory; and fetch logic coupled to the prefetch logic and the subsequent stage, the fetch logic configured to fetch the requested data if the requested data is not cached in the cache memory, the fetch logic configured to supply the requested data to the subsequent stage, the fetch logic configured to cache the requested data in the cache memory.

9. The device described in claim 8 wherein a least recently updated (LRU) replacement policy is employed when the requested data are cached in the cache memory.

10. The device described in claim 9 wherein the data request signal comprises:

an address signal indicating a memory address of the requested data;

a direction signal indicating a direction in which the requested data are being read from a memory;

a shift/mask signal indicating a shift amount of the requested data;

a type signal indicating the type of the requested data; and a mode signal, the mode signal indicating whether the pipeline processor is operating in the first mode or in the second mode.

11. The device described in claim 10 wherein only a portion of the requested data corresponding with the direction in which the requested data are read from the memory are cached in the cache memory.

12. The device described in claim 10 wherein fetch logic comprises shifting and merging logic, the shifting and merging logic configured to shift and merge a first and a second data entry in response to the shift/mask signal to generate the requested data.

13. The device described in claim 8 wherein the data caching mechanism further comprises an intermediate queue coupled between the prefetch logic and the fetch logic.

14. The device described in claim 6 wherein the data further comprises a third type of data wherein the cache memory is further configured to cache only the third type of data in a third portion of the cache memory when the pipeline processor is configured to operate in the second mode.

15. The device described in claim 8 wherein the fetch logic fetches the requested data from a memory if the requested data is not cached in the cache memory.

16. The device described in claim 14 wherein the first type of data is texel information, the second type of data is pixel information and the third type of data is Z information.

17. In a pipeline processor configured to process a task, the task propagating through an earlier stage and then a subsequent stage in the pipeline processor, a method for supplying requested data to the subsequent stage comprising the steps of:

requesting the requested data with the earlier stage with respect to the task after the task propagates to the earlier stage and before the task propagates to the subsequent stage;

fetching the requested data in response to the requesting step before the task propagates to the subsequent stage;

supplying the requested data to the subsequent stage with a data caching mechanism with respect to the task when the task propagates to the subsequent stage.

18. The method described in claim 17 including the additional step of caching the requested data in the data caching mechanism with a cache memory.

19. The method described in claim 18 including the additional step of adapting a configuration of the cache memory in response to a pipeline processor operation mode.

20. The method described in claim 19 wherein the pipeline processor is configured to have a first mode of operation and a second mode of operation.

21. The method described in claim 20 wherein the requested data comprises a first type of data and a second type of data.

22. The method described in claim 21 wherein only the first type of data is cached in the cache memory when the pipeline processor operates in the first mode.

23. The method described in claim 21 wherein only the first type of data is cached in a first portion of the cache memory and only the second type of data is cached in a second portion of the cache memory when the pipeline processor operates in the second mode.

24. The method described in claim 18 wherein the data caching mechanism further comprises a prefetch logic and a fetch logic.

25. The method described in claim 24 including the additional step of ascertaining whether the requested data is cached in the cache memory, the data caching mechanism supplying the requested data to the subsequent stage from the cache memory if the requested data is cached in the cache memory.

26. The method described in claim 25 wherein the fetching step comprises the step of fetching the requested data from a memory if the requested data is not cached in the cache memory.

27. The method described in claim 26 wherein the fetching step comprises the steps of ascertaining whether the requested data exists only in a first data entry from the memory or whether the requested data exists in the first and a second data entries from the memory.

28. The method described in claim 27 including the additional step of caching only one of the first and second data entries from the memory, the one of the first and second data entries corresponding with a direction in which the requested data are being read from the memory.

29. The method described in claim 27 including the additional step of shifting and merging together the first and second data entries to construct the requested data.

30. The method described in claim 23 wherein the requested data further comprises a third type of data wherein the cache memory is further configured to cache only the third type of data in a third portion of the cache memory when the pipeline processor operates in the second mode.

31. The computer system described in claim 30 wherein the first type of data is texel information, the second type of data is pixel information and the third type of data is Z information.

32. A computer system comprising:

a central processing unit (CPU);

a system memory coupled to the CPU;

a bus coupled to the CPU; and a graphics subsystem coupled to the bus for generating and displaying data on an output display, the graphics subsystem comprising:

the data stored in a local memory;

a pipeline processor configured to process a task, the task propagating through an earlier stage and then a subsequent stage in the pipeline processor;

a data request signal generated by the earlier stage for requested data to be supplied to the subsequent stage, the data request signal generated by the earlier stage with respect to the task after the task propagates to the earlier stage and before the task propagates to the subsequent stage;

a data caching mechanism between the local memory and the pipeline processor, the data caching mechanism configured to to begin fetching the requested data in response to the data request signal from the earlier stage before the task propagates to the subsequent stage, the data caching mechanism configured to supply the requested data to the subsequent stage with respect to the task after the task propagates to the subsequent stage; and a video output circuit coupled to the local memory, the video output circuit configured to output the data to the output display.

33. The computer system described in claim 32 wherein the data caching mechanism comprises a cache memory, the cache memory configured to cache the requested data.

34. The computer system described in claim 33 wherein the pipeline processor is configured to have a first mode of operation and a second mode of operation.

35. The computer system described in claim 34 wherein the data comprises a first type of data and a second type of data.

36. The computer system described in claim 35 wherein the cache memory has a first configuration when the pipeline processor operates in the first mode and the cache memory has a second configuration when the pipeline processor operates in the second mode.

37. The computer system described in claim 36 wherein the cache memory stores only the first type of data in the first configuration and a first portion of the cache memory stores only the first type of data and a second portion of the cache memory stores only the second type of data in the second configuration.

38. The computer system described in claim 33 wherein a least recently updated (LRU) replacement policy is employed when the requested data are cached in the cache memory.

39. The computer system described in claim 38 wherein a first data entry and a second data entry are fetched from the local memory when the requested data is not cached in the cache memory.

40. The computer system described in claim 39 wherein only one of the first and second data entries are cached in the cache memory.

41. The computer system described in claim 40 wherein the cached only one of the first and second data entries corresponds with the a direction in which the first and second data entries are read from the local memory.

42. The computer system described in claim 39 wherein the first and second data entries are shifted and merged by the data caching mechanism to construct the requested data.

43. The computer system described in claim 37 wherein the data further comprises a third type of data wherein the third type of data is stored in a third portion of the cache memory in the second configuration.

44. The computer system described in claim 43 wherein the first type of data is texel information, the second type of data is pixel information and the third type of data is Z information.

45. The computer system described in claim 32 wherein the graphics subsystem further comprises a first in first out memory (FIFO) coupled between the local memory and the data caching mechanism.

* * * * *

UNITED STATES PATENT AND TRADEMARK OFFICE
CERTIFICATE OF CORRECTION

PATENT NO. : 5,761,720
DATED : June 2, 1998
INVENTOR(S) : Krishnamurthy et al.

It is certified that error appears in the above-identified patent and that said Letters Patent is hereby corrected as shown below:

In column 13 at line 5 delete the second occurrence of "to"

In column 15 at line 41 delete the second occurrence of "to"

Signed and Sealed this

Third Day of April, 2001

Attest:

NICHOLAS P. GODICI

Attesting Officer

Acting Director of the United States Patent and Trademark Office